United States Patent [19]
Fieberg et al.

[11] Patent Number: 4,730,386
[45] Date of Patent: Mar. 15, 1988

[54] CONNECTOR WRENCH HOLDER

[76] Inventors: Russell F. Fieberg; Donald E. Fieberg, both of 25282 Tasman Rd., Laguna Hills, Calif. 92653

[21] Appl. No.: 40,210

[22] Filed: Apr. 15, 1987

[51] Int. Cl.[4] .............................................. B23P 19/04
[52] U.S. Cl. ...................................... 29/758; 81/176.1; 81/423; 269/3
[58] Field of Search ................. 29/758, 762, 764, 741, 29/750–752, 33 M; 269/3, 47, 246, 287; 81/176.1, 176.15, 423; 294/27.1

[56] References Cited

U.S. PATENT DOCUMENTS 4,068,374 1/1978 Coller .................................. 29/758
4,290,193 9/1981 Anderton et al. ................... 29/764

OTHER PUBLICATIONS

Yevchak, S. J. et al., Extraction and Insertion Tool for Printed Circuit Cards, IBM Tech. Disclosure Bull., vol. 2, No. 3, Oct. 1959, p. 38.

*Primary Examiner*—P. W. Echols
*Attorney, Agent, or Firm*—I. Michael Bak-Boychuk

[57] ABSTRACT

A holder for pads on which dummy connector mates are fixed includes a U-shaped bracket arrangement grooved to receive the pads. Once the selected pad is in position threaded fasteners are extended into the edge cutouts in the pad to fix the pad in the holder.

3 Claims, 3 Drawing Figures

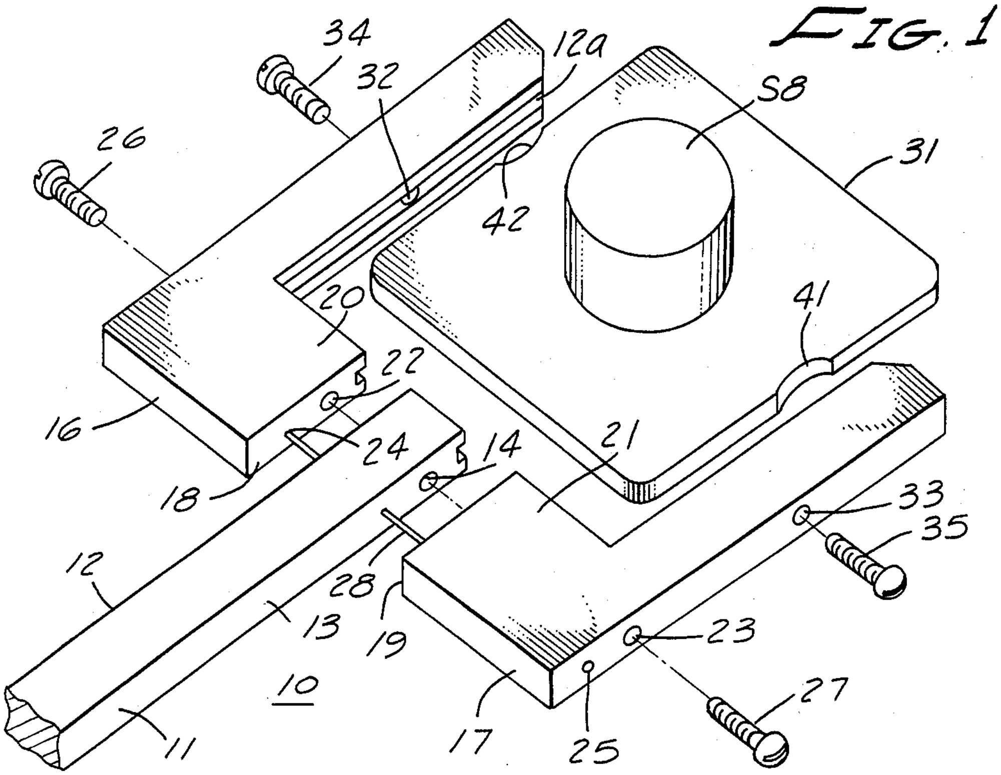
FIG. 1
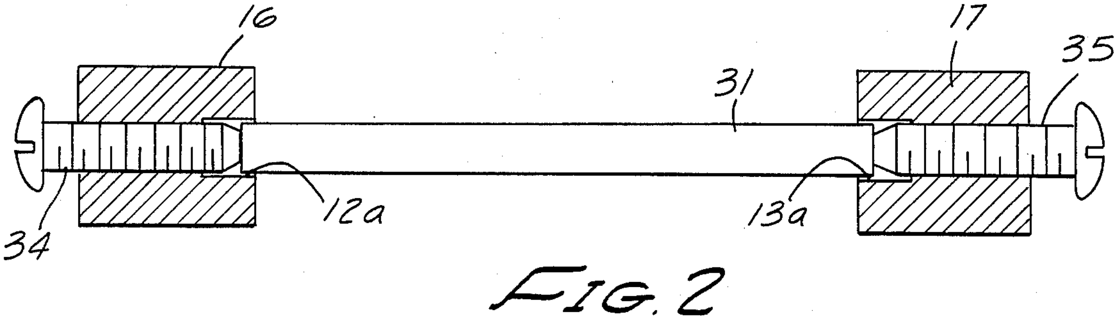
FIG. 2
FIG. 3
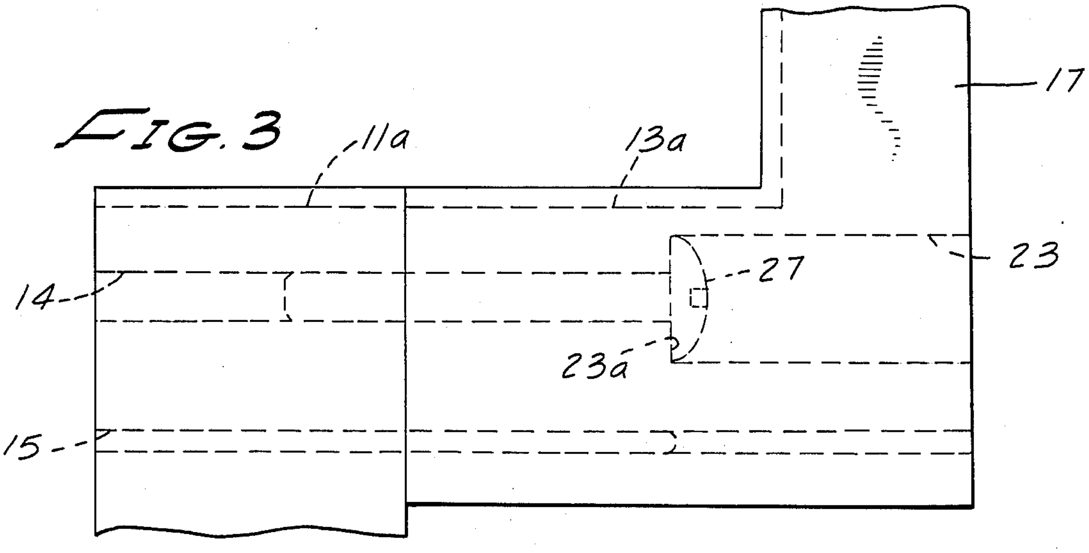

CONNECTOR WRENCH HOLDER

BACKGROUND OF THE INVENTION

1. Field of the Invention

The present invention relates to manual tools and more particularly to manual holders of plugs and receptacles for electrical wiring.

2. Description of the Prior Art

In the course of assembly of multiple pin connectors it is often desirable to have the connector engaged to a dummy mate. This mating dummy connector is then useful for the application of the forces and moments necessary to effect assembly and thus the assembled connector remains protected from damage.

Those skilled in the art will appreciate that multiple pin connectors are formed in a variety of standardized configurations and the complement of dummy mating connectors is therefore extensive. Each connector assembly is characterized by a rigid outer shell or casing in which a resilient body carrying the pins or sockets is received. In this form the connector assembly is particularly adapted for large forces and thus lends itself to manipulative convenience enhanced by extensions or tools.

In the past, connector assembly tools were devised as integral tool assemblies where one tool accommodates a single connector configuration. Consequently, the technician is required to carry a large tool array in the course of any field work. This single tool configuration is now extensively used, as exemplified by standardized military model designations MS 3480-3482 examples of which are sold by ESC, Inc., Hawthorne, Calif.

An assembly tool which adapts to the various standardized connectors is therefore desired and it is one such tool that is disclosed herein.

SUMMARY OF THE INVENTION

Accordingly, it is the general purpose and object of the present invention to provide a tool holder in the form of a wrench in which a variety of connectors may be received.

Other objects of the invention are to provide a holder useful with a variety of connectors.

Yet further objects are to provide a connector wrench which is easily produced and conveniently implemented for use.

Briefly, these and other objects are accomplished within the present invention by providing a right and left L shaped bracket which are then attached as tines of a fork to the sides of a handle bar to form a U-shaped frame. The interior, opposed edges of the brackets are grooved in a continuous coplanar slot of a uniform width for selective receipt of the edges of a rectangular pad on which the plug or receptacle mate of a connector are then mounted. It is this plug or receptacle that then provides the function of the dummy mate for the connector worked on.

Each pad, moreover, includes opposed peripheral cutouts in the received edges which align adjacent tapped openings in the opposed arms of the brackets. Thumbscrews or other threaded fasteners received in the tapped openings are then advanced into the edge cutouts to capture and retain the pad.

In this form various connector configurations can be selectively fixed in the tool. To facilitate convenient use the base portions of the brackets are expanded in width and thus provide a surface for the application of force. This same expanded surface provides an expanded edge for contact with the handle bar which may be used to adjust for wear. Thus the brackets are both pinned and fastened by a threaded connector to the handle bar and as wear occurs the threaded take up against the pin will then compensate.

The foregoing brackets may then be formed in various dimensions for various pad sizes and in various lengths for multiple pad mounting.

BRIEF DESCRIPTION OF THE DRAWINGS

FIG. 1 is a perspective illustration, separated by parts, of the inventive holder;

FIG. 2 is a sectional end view taken along line 2—2 of FIG. 1; and

FIG. 3 is a top view detail illustrating the manner of assembly of the inventive holder.

DESCRIPTION OF THE PREFERRED EMBODIMENT

As shown in FIGS. 1-3 the inventive connector holder, generally designated by the numeral 10, includes an elongate handle 11 formed as a bar of rectangular section and characterized by two parallel lateral surfaces 12 and 13. Extending across surfaces 12 and 13, proximate one end of handle 11, is a tapped drilling 14 in parallel with a dowel hole 15. A right and left lateral L-shaped bracket 16 and 17 is then fixed by the end surfaces 18 and 19 of the base legs 20 and 21 thereof to the lateral surfaces 12 and 13. To effect this attachment each base leg 20 and 21 is provided with two parallel drillings 22 and 24 and 23 and 25 for receiving threaded fasteners 26 and 27 extending into openings 14 and a dowel 28 in the opening 15.

The brackets are thus fixed to the handle bar to form a U-shaped tool. A common groove comprising groove segments **12*a*, 13*a* and 11*a* in the interior of the U is then exposed to receive the peripheral edges of a rectangular pad 31. Brackets 16 and 17, moreover, include opposed threaded openings 32 and 33 in which thumbscrews 34 an 35 are received and which then engage edge cutouts 41 and 42** in the pad.

Thus pad 31 is selectively engaged within the holder 10 to expose a connection, generally at S8, fixed thereon. Pad 31 may thus be carried in various assortments for the connectors serviced thereby.

One should note that the base legs 20 and 21 may be of several standardized dimensions. The width of the U is thus selectable by the combination of the selected brackets, and the pads 31 may thus be sorted into size groupings for the various groupings of standardized connectors.

Moreover, brackets 16 and 17 may be formed to various lengths with openings 32 and 33 repeated along the length at spacing intervals of one pad (not shown). In this form several pads may be mounted at one time for the convenience to the user.

This convenience in assembly also allows for compensation for wear and force distortion by tightening the fasteners 26 and 27 onto shoulders **23*a*** in their corresponding bores.

Obviously, many modifications and changes may be made to the foregoing without departing from the spirit of the invention. It is therefore intended that the scope of the invention be determined solely on the claims appended hereto.

What is claimed is:

1. A holding tool for use with electrical connectors, comprising:

a rectangular pad conformed to engage a connector, including a first and second opposing lateral edge each said edge being provided with a cutout;

a holder including a first L-shaped bracket and a second L-shaped bracket each characterized by a base leg and an orthogonal leg, a handle conformed for engagement to the ends of said base legs of said first and second bracket, and fastening means for attaching said brackets to said handle, said brackets and said handle including a groove conformed for receiving said pad and engagement means received in said brackets for engaging said cutouts.

2. Apparatus according to claim 1 wherein:

said engagement means includes threaded fasteners extending through said orthogonal legs of said brackets.

3. Apparatus according to claim 2 wherein:

said fastening means include a pin extending through said handle into said base legs.

* * * * *